US009588775B2

(12) United States Patent
Scales et al.

(10) Patent No.: US 9,588,775 B2
(45) Date of Patent: *Mar. 7, 2017

(54) METHOD AND APPARATUS FOR CONFIGURING ELECTRONIC DEVICES TO PERFORM SELECTABLE PREDEFINED FUNCTIONS USING DEVICE DRIVERS (71) Applicant: Nokia Corporation, Espoo (FI)

(72) Inventors: James Scales, Hurst (GB); Varley Bullard, Rowlands Castle (GB); Petri Syrjala, Chula Vista, CA (US)

(73) Assignee: Nokia Technologies Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 14/149,932

(22) Filed: Jan. 8, 2014

(65) Prior Publication Data
US 2014/0122750 A1 May 1, 2014

Related U.S. Application Data (63) Continuation of application No. 12/333,258, filed on Dec. 11, 2008, now Pat. No. 8,738,834, and a continuation of application No. 12/333,254, filed on Dec. 11, 2008, now Pat. No. 8,751,721, which is a continuation of application No. 10/103,782, filed on Mar. 25, 2002, now abandoned, and a continuation of
(Continued)

(30) Foreign Application Priority Data

Mar. 28, 2001 (GB) .................................. 0107741.1

(51) Int. Cl.
G06F 13/20 (2006.01)
G06F 9/44 (2006.01)
G06F 13/42 (2006.01)
G06F 13/38 (2006.01)

(52) U.S. Cl.
CPC .......... G06F 9/4411 (2013.01); G06F 13/385 (2013.01); G06F 13/426 (2013.01)

(58) Field of Classification Search
CPC ..... G06F 13/385; G06F 13/426; G06F 9/4411
USPC ....................................................... 710/313
See application file for complete search history.

(56) References Cited

U.S. PATENT DOCUMENTS 5,893,891 A  4/1999 Zahedi
6,003,097 A  12/1999 Richman et al.
(Continued)

FOREIGN PATENT DOCUMENTS

DE  10031945  3/2001
EP  0812093  12/1997
(Continued)

OTHER PUBLICATIONS http://msdn.microsoft.com/en-us/library/ms791080.aspx, 2010.
(Continued)

Primary Examiner — Nimesh G Patel
(74) Attorney, Agent, or Firm — Locke Lord LLP (57) ABSTRACT A multifunctional mobile telephone handset is connected to a PC using a Universal Serial Bus. During bus enumeration, a device class descriptor is returned by the handset to the PC. The PC's operating system receives information relating to one of the functions of the handset and assigns an appropriate device driver.

10 Claims, 6 Drawing Sheets

Related U.S. Application Data application No. 10/103,782, filed on Mar. 25, 2002, now abandoned.

(56) References Cited

U.S. PATENT DOCUMENTS

| | | | |
|---|---|---|---|
| 6,005,613 | A | 12/1999 | Endsley et al. |
| 6,012,103 | A | 1/2000 | Sartore et al. |
| 6,085,265 | A * | 7/2000 | Kou ............................. 710/63 |
| 6,115,039 | A | 9/2000 | Karren et al. |
| 6,131,134 | A | 10/2000 | Huang et al. |
| 6,295,441 | B1 | 9/2001 | Bjorkengren |
| 6,466,437 | B1 | 10/2002 | Sakuragi et al. |
| 6,557,033 | B2 | 4/2003 | Maeda |
| 6,625,472 | B1 * | 9/2003 | Farazmandnia et al. ..... 455/557 |
| 6,704,824 | B1 | 3/2004 | Goodman |
| 6,804,727 | B1 * | 10/2004 | Rademacher .................... 710/9 |
| 6,806,977 | B1 | 10/2004 | Freeny et al. |
| 6,816,931 | B2 | 11/2004 | Shih |
| 6,857,034 | B1 * | 2/2005 | DiSanza et al. ............. 710/106 |
| 7,000,035 | B1 * | 2/2006 | Uchizono et al. ................ 710/2 |
| 7,099,490 | B1 | 8/2006 | Fujita et al. |
| 2002/0101515 | A1 | 8/2002 | Yoshida et al. |
| 2002/0116482 | A1 * | 8/2002 | Maeda ......................... 709/223 |
| 2002/0188887 | A1 | 12/2002 | Largman et al. |

FOREIGN PATENT DOCUMENTS

| | | |
|---|---|---|
| EP | 0905608 | 3/1999 |
| EP | 1126378 | 8/2001 |
| EP | 1229720 | 8/2002 |
| EP | 0786736 | 11/2003 |
| GB | 2321732 | 8/1998 |
| GB | 2351576 | 1/2001 |
| JP | 11-16144 | 6/1999 |
| JP | 11-161444 | 6/1999 |
| JP | 2000194645 | 7/2000 |
| JP | 2000-305890 | 11/2000 |
| JP | 2000151938 | 2/2001 |
| JP | 200935026 | 2/2009 |
| WO | WO9719402 | 5/1997 |

OTHER PUBLICATIONS http://www.microsoft.com/whdc/system/bus/usb/USBFAQ_intermed.mspx, 2010.

http://www.microsoft.com/whdc/system/bus/usb/USBFAQ_intro.mspx, 2010.

Nokia 6300 User Guide, date unknown.

English Translation of Office Action for Japanese Patent Application Serial No. 2009-186736, dated Jul. 8, 2011.

"Universal Serial Bus Specification", Revision 2.0, Apr. 27, 2000, 38 pages.

"Universal Serial Bus Common Class Specification", Revision 1.0, Dec. 16, 1997, 16 pages.

Axelson, J., "USB Complete—Everything You Need to Develop Custom USB Peripherals", Lakeview Research, Madison, WI, 1999, 39 pages.

"USB Feature Specification: Dynamic Logical-Device", Intel Corporation, Revision 1.0, Oct. 27, 1999, 14 pages.

USB-Implementierungsspezifikation: Dynamic Logical-Device [Dynamisches Logikgerat], Intel Corporation, Revision 1.0, Oct. 27, 1999, 14 pages.

"Digital Still Camera", Sony Corporation, 2001, 208 pages.

"Sony DSC-S75 Review", Digital Photography Review, 2001, downloaded from http://www.dpreview.com/reviews/sonydscs75/ on Dec. 8, 2013, 3 pages.

"Digital Cameras—Sony DSC-S75 Digital Camera Review", 2001, downloaded from http://www.imaging-resource.com/PRODS/S75/S75P.HTM on Dec. 8, 2013, 21 pages.

"Review: Overview—Sony DSC-S75", Steve's Digicams, 2001, downloaded from http://www.stevesdigicams.com/camera-reviews/sony/dsc-s75 on Dec. 8, 2013, 7 pages.

"S75: A-Digital-Eye.com first impressions", Digital Photography Review, Sony Cyber-shot Talk Forum, 2001, downloaded from http://www.dpreview.com/forums/post/944604 on Dec. 8, 2013, 2 pages.

"PMA 2001 Special Report", Digital Camera Resource Page, 2001, downloaded from http://www.dcresource.com/specials/pma_2001.shtml on Dec. 8, 2013, 9 pages.

"PMA 2001 show report: Section four", Digital Photography Review, 2001, downloaded from http://www.dpreview.com/news/2001/02/16/pma04/print on Dec. 8, 2013, 8 pages.

"PMA 2001 Show, NEWS! —Sony announce numerous new digital cameras!", 2001, downloaded from http://www.imaging-resource.com/EVENTS/PMAS01/981759700.html on Dec. 8, 2013, 2 pages.

English Translation of Japanese Office Action dated Aug. 5, 2013 for Japanese Patent Application No. 2011-219815—5 pages.

Universal Serial Bus Specification, Revision 1.1, Sep. 23, 1998, pp. 4, 23, 29, 180, 215 and 216.

Sony Digital Still Camera, Model No. DSC-S75, Operating Instructions, 2001, 100 pages.

Sony Digital Still Camera, Model No. DSC-S75/S85, Operating Instructions, 2001, 104 pages.

English Language Machine Translation of German Patent Application Publication No. DE10031945, 24 pages.

Axelson, J. , "USB Complete—Everything You Need to Develop Custom USB Peripherals" Lakeview Research, 1999, Coverpage, pp. i-xi, 24-30, 73-90, Backcover and Corrections page, 40 pages (total).

* cited by examiner

| bmRequestType | 1000000B |
|---|---|
| bRequest | GET_DESCRIPTOR |
| wValue | DEVICE |
| wIndex | 0 |
| wLength | |
| data | |

| bLength | 1000000B |
|---|---|
| bDescriptorType | DEVICE |
| bcdUSB | 210H |
| bDeviceClass | 02 |
| bDeviceSubClass | |
| dDeviceProtocol | |
| bMaxPachetSize | |
| idVendor | |
| idProduct | |
| bcdDevie | |
| iManufacturer | |
| iProduct | |
| iSerialNumber | |
| bNumConfiguration | |

METHOD AND APPARATUS FOR CONFIGURING ELECTRONIC DEVICES TO PERFORM SELECTABLE PREDEFINED FUNCTIONS USING DEVICE DRIVERS

FIELD OF THE INVENTION

The present invention relates to a method of configuring electronic devices, having particular although not exclusive application to configuring a Universal Serial Bus device and a host.

BACKGROUND ART

A Universal Serial Bus (USB) standard has been developed which allows up to 127 peripheral devices such as printers, scanners, keyboards, modems, cameras and storage devices to be attached to a host, usually a personal computer (PC), through a 4-wire bus. These devices can be connected to the PC either directly or via hubs which provide additional connections. USB has the advantage that connection of different types of devices becomes standardised. Furthermore, a device can be connected while the PC is switched on and while other devices axe in use. USB supports user data rates of up to 8 Mbit/s for each device which is suitable for low to medium data rate applications. An overview of USB may be found in "USB Hardware & Software" by J. Gamey et al. (Anna Books, 1998) [ISBN 0-929392-3-X] and a current version of the USB specification is available at www.usb.org or from USB-IF Administration, 5440 SW Westgate Drive, Suite 217, Portland, Oreg. 97221 USA.

A device is connected to a USB port provided by the PC or a hub. Once physically connected to the device, the PC controls attachment and configuration of the device. To achieve this, the PC is installed with a USB driver which is usually provided by the PC's operating system. The PC is also installed with a device driver to control the device once it is attached and configured so that application software on the PC can use the device. The device driver is often provided by the operating system although for unusual devices, a user may need to install a specific device drives using installation disks.

Devices fall into two main categories, namely hubs and functions. Hubs provide additional attachment points to the USB. Functions catered the capabilities of the computer. Most devices which are not a hub, such as a mouse, implement a single function. Some devices, such as a monitor having in-built speakers, implement multiple functions and have an embedded hub. Such a device is known as a compound device and appears to the PC as a hub with a collection of individual, non-removable functions.

The USB standard was originally designed to accommodate simple peripheral devices which fulfil a single function. When a single function device, such as a mouse, is plugged into a PC for the first time, the USB driver detects, identifies and configures the device and the operating system automatically assigns a device driver, which in the case of a mouse is a mouse driver. Alternatively, a user may install and/or assign a specific device driver. When a compound device is plugged in for the first time the same process of detection, identification and configuration is carried out for each respective function so that all the functions of the compound device are available to the PC.

However, a problem arises if a device implements multiple disconnectable functions. Such a device appears to the PC as a single function device. When the device is plugged into the PC for the first time, the operating system assigns a device driver according to this function. Once assigned, the device is tied to the device driver so that whenever the device is disconnected from the PC and then reconnected, the same device driver is assigned to the device. This abrogates the multifunctionality of the device.

The present invention seeks to help overcome this problem.

SUMMARY OF THE INVENTION

According to a first aspect of the present invention there is provided a method of configuring first and second electronic devices, said second device being able to perform a plurality of predefined functions, the method comprising receiving, at said second device, preference information relating to one of said plurality of functions of said second device, providing said first device with information relating to said one function and providing, at said first device, an interface fox interfacing with said one function so as to allow said first device to use said one function.

The first device may be a Universal Serial Bus host, such as a personal computer and the second device may be a Universal Serial Bus device, such as a mobile telephone handset.

The method may further comprise connecting said first and second devices together by a bus for transmitting signals and exchanging configuration signals between said first and second devices through said bus for establishing addressable communication between said first and second devices. The exchange of configuration signals may include said provision of information relating to said one function. The provision of information may comprise sending a message from said second device to said first device. The provision of information may include providing data identifying said one function.

The method may comprise said first device requesting information from said second device.

The provision of said interface may comprise assigning a device driver and may comprise executing a computer program.

According to a second aspect of the present invention there is provided a method of using data processor for communication with an electronic device, the method comprising receiving first information relating to a first function of said device, providing a first interface for interfacing with said first function so as to allow said data processor to use said first function, receiving second information relating to a second function of said device and providing a second interface for interfacing with said second function so as to allow said data processor to use said second function in preference to said first function.

According to a third aspect of the present invention there is provided a method of configuring an electronic device for communication with data processor, the method comprising receiving preference information relating to one of a plurality of predefined functions of said device and providing information relating to a first function to said data processor. The method may further comprise allowing said data processor to use said one function.

According to a fourth aspect of the present invention there is provided a computer program comprising computer code for a data processor configured for communication with an electronic device, to make said data processor receive preference information relating to a first function of said device, provide a first interface for interfacing with said first function so as to allow said data processor to use said function, receive second information relating to a second function of said device and provide a second interface for interfacing with said second function so as to allow said data processor to use said second function in preference to said first function.

According to a fifth aspect of the present invention there is provided a computer program comprising computer code for an electronic device able to perform a plurality of predefined functions and configured for communication with a data processor, to make said device receive information relating to one of said plurality of functions and provide information relating to said function to said data processor. The program may further make said device allow said data processor to use said one function.

According to a sixth aspect of the present invention there is provided an apparatus comprising first and second electronic devices, said second device being able to perform a plurality of functions, said apparatus including an input for receiving preference information relating to one of said plurality of functions of said second device, a link for providing to said first device information relating to said one function and a controller for providing an interface for interfacing with said one function so as to allow said first device to use said one function.

The first device may be Universal Serial Bus host, such as a personal computer and the second device may be a Universal Serial Bus device, such as a mobile telephone handset.

According to a seventh aspect of the present invention there is provided an electronic device which is able to perform a plurality of function comprising an input for receiving preference information relating to one of said plurality of functions and an output for providing to another device information relating to said one function. The device may further comprise a link for allowing said other device to use said one function. The device may be a mobile telephone handset.

According to an eighth aspect of the present invention there is provided a Universal Serial Bus device able to perform a plurality of predefined functions comprising an input for receiving preference information relating to one of said plurality of functions and output for providing to a host information relating to said one function. The device may further comprise a link for allowing said host to use said to use said one function. The device may be a mobile telephone handset.

BRIEF DESCRIPTION OF THE DRAWINGS

An embodiment of the present invention will now be described, by way of example, with reference to the accompanying drawings in which.

PREFERRED EMBODIMENT OF THE INVENTION

Figure 1:
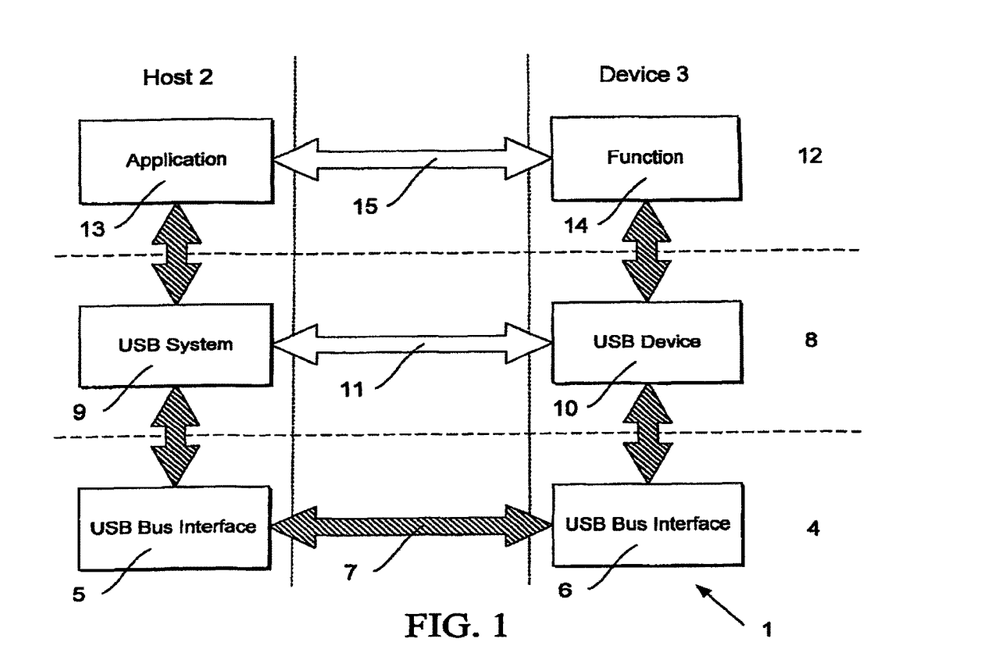
FIG. 1 is schematic diagram of a general Universal Serial Bus (USB) arrangement.

Referring to FIG. 1, a general USB arrangement 1 comprises a host 2, such as a personal computer (PC), connected to a peripheral device 3, for instance a mouse, by means of a Universal Serial Bus (USB). The USB comprises hardware and software which allows a capability of the device 3, in this example cursor control, to be provided to the host 2. In FIG. 1, the USB arrangement 1 is represented as a three-layered communication system.

A bottom layer 4 handles the electrical connection between the host 2 and the device 3. The host 2 and device 3 each have USB interfaces 5, 6 providing ports (not shown) by which they are connected using a USB cable 7.

A middle layer 8 is concerned with controlling data transfer between the host 2 and device 3. A USB system 9 on the host side is responsible for managing the USB by coordinating with a USB device 10 on the device side. In order to establish a connection and to configure the device 3, a logical control link, called a default pipe 11, is defined.

A top layer 12 is concerned with utilisation of the device 3. Application software 13 on the host 2 interfaces with a function 14 of the device 3 through a logical connection called a pipe 15.

Further information regarding the USB arrangement may be found in Chapter 10 of the USB Specification Revision 2.0.

Figure 2:
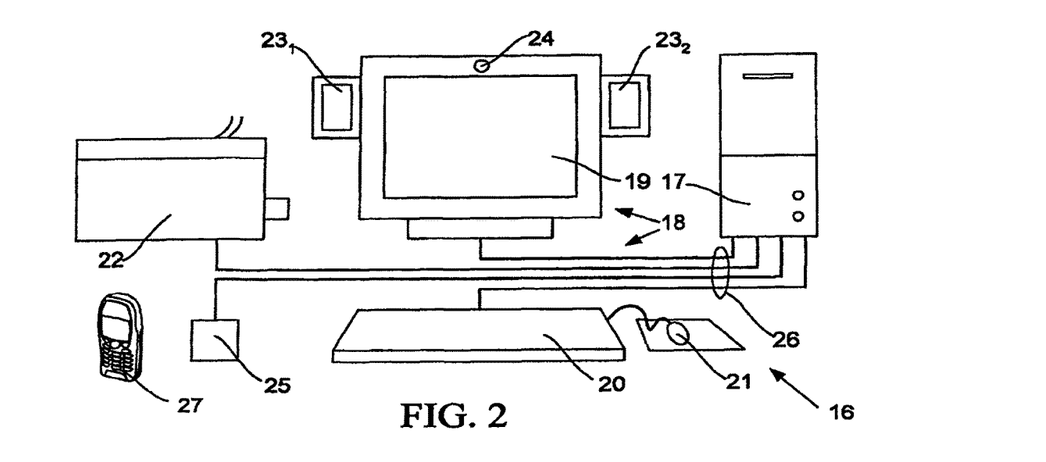
FIG. 2 shows a personal computer (PC) and peripheral devices attached to the computer using a USB.

Referring to FIG. 2, a PC system 16 comprises a PC 17 connected to a plurality of peripheral devices 18 including a monitor 19, a keyboard 20, a mouse 21, a printer 22, first and second speakers $23_1$, $23_2$, a microphone 24 and a USB hub 25 using the USB. A plurality of USB cables 26 connect the PC 17 to the peripheral devices 18. The USB hub 25 provides a means for connecting a mobile telephone handset 27 to the PC 17.

Figure 3:
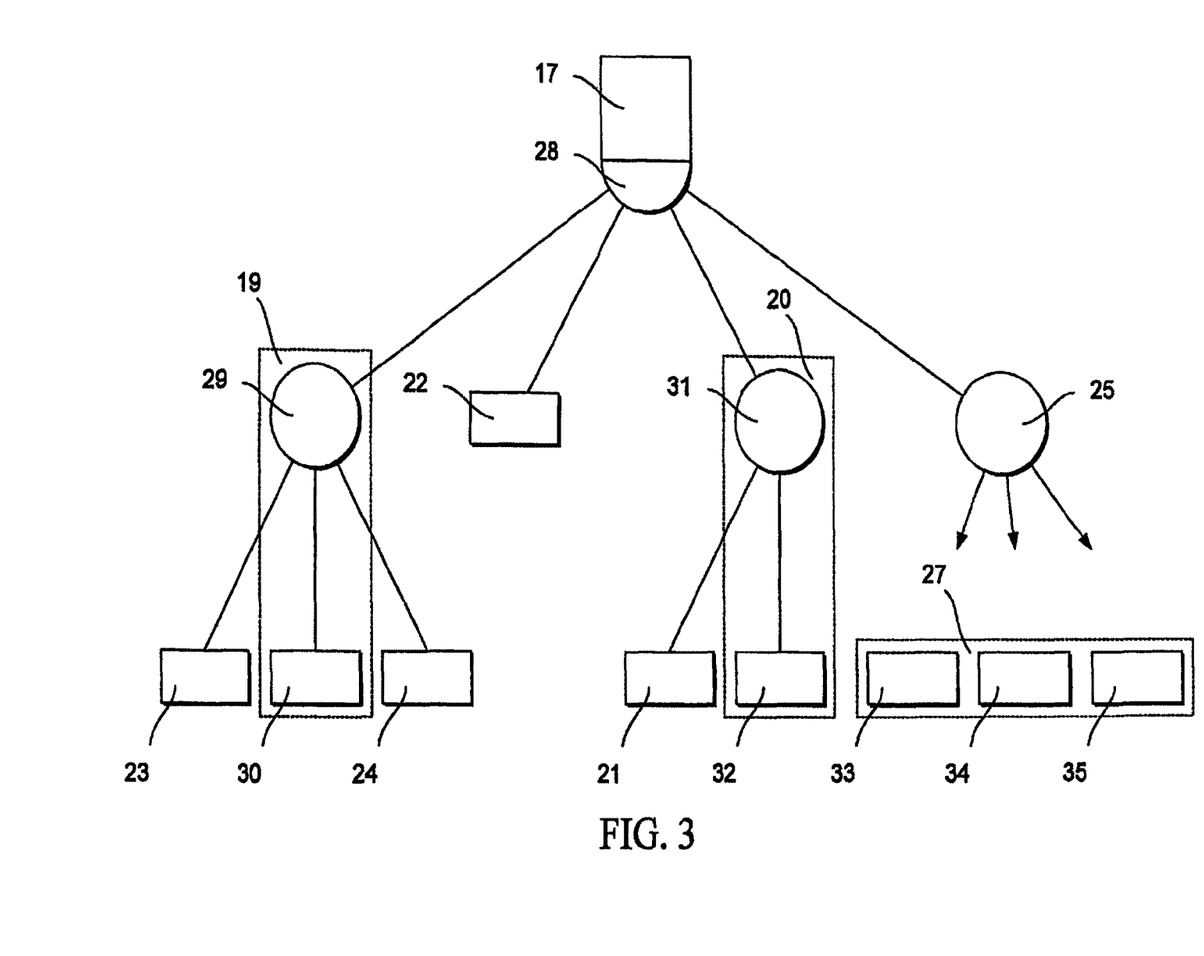
FIG. 3 shows a bus topology for the apparatus shown in FIG. 2.
Figure 5:
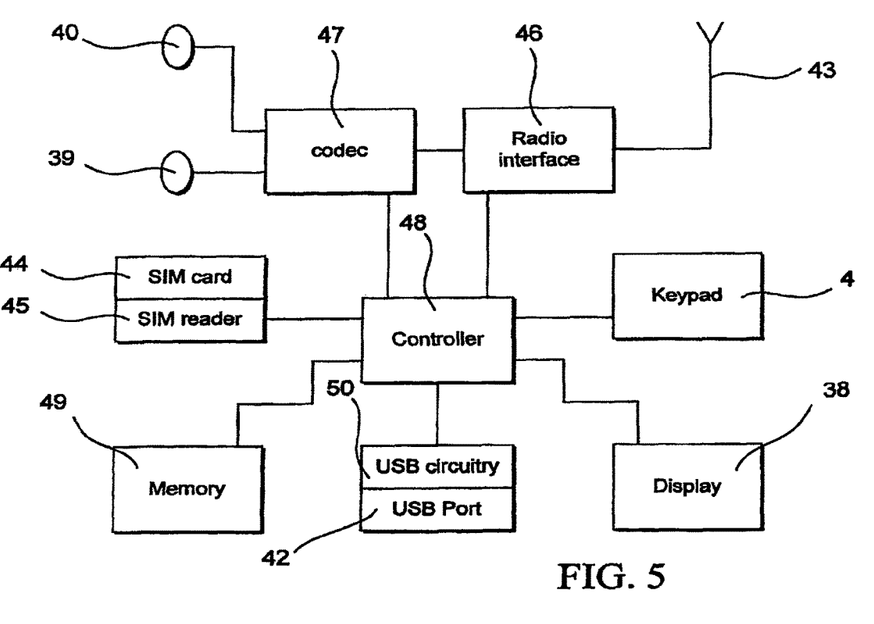
FIG. 5 is a schematic diagram of mobile telephone circuitry of the handset shown in FIG. 4.

Referring to FIG. 3, the PC 17 serves as the USB host and has a hub, called a root hub 28, directly connected to it, for extending the USB. In this example, the root hub 28 provides four ports (not shown). The monitor 19 is a compound device having an embedded hub 29 and implements a monitor function 30. The keyboard 20 is also a compound device having an embedded hub 31 and implements a keyboard function 32. The mobile telephone handset 27 is multifunctional. In this example, it has a microphone function 33 for providing audio signals, a modem 34 for dial-up networking and a controller 35 for implementing Infrared Data Association's (IrDA) Object Exchange Protocol (OBEX) which allows synchronising of personal information management (PIM). In this example, functions such as the modem 34 and the controller 35 are implemented in software by the handset's controller (FIG. 5). It will be appreciated that other functions may be implemented in the handset 27.

The monitor 19, keyboard 20, mouse 21, printer 22, speakers $23_1$, $23_2$ and the microphone 24 are attached to the PC 17 and configured in manner well known per se.

Figure 4:
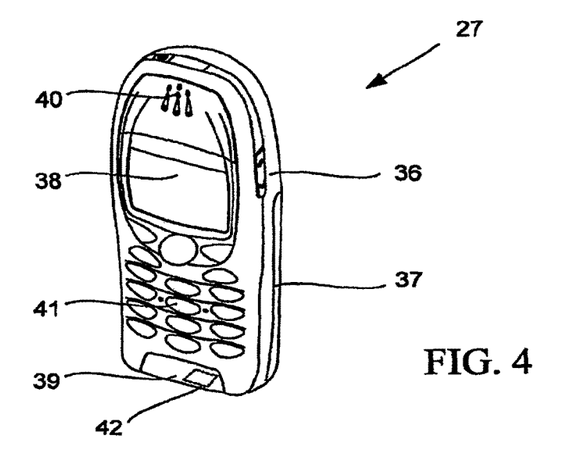
FIG. 4 shows a perspective view of a mobile telephone handset.

Referring to FIGS. 4 and 5, the mobile telephone handset 27 comprises a casing 36, a battery pack 37, liquid crystal display (LCD) panel 38, a microphone 39, an earpiece 40, keypad 41, USB port 42, antenna 43, subscriber identification module (SIM) card 44 and SIM card reader 45. Mobile telephone circuitry includes radio interface circuitry 46, codec circuitry 47, controller 48, memory 49 and USB transceiver circuitry 50. The USB transceiver circuitry 50, together with the USB port 34 provide the hardware for implementing a device USB interface (FIG. 1).

A method by which a user can select a function of the mobile telephone handset 27 and attach the handset 27 to the PC 17 so that it is configured with an appropriate device driver will now be described.

Figure 6:
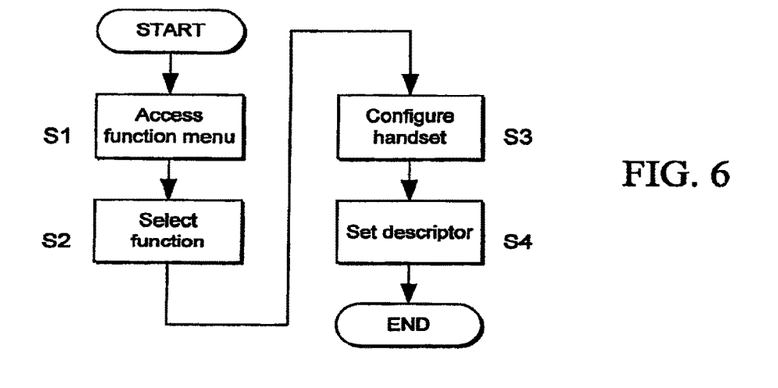
FIG. 6 is a process flow diagram by which a user is allowed to select a function of the mobile telephone handset shown in FIG. 4.

Referring to FIG. 6, the handset 27 receives preference information relating to one of the plurality of functions 33, 34, 35 the user enters a functions menu on the handset 27 (step S1) and selects one of a plurality of functions which the handset can execute (step S2). In this example, the user wants to access a dial-up internet service provider and so they select the modem function 34. A handset operating system configures the handset (step S3). In addition, the controller 48 sets a pointer to one of a plurality of device descriptors DEVICE held in memory 49 corresponding to the modem function 34 (step S4). The nature and purpose of the device descriptors DEVICE will be described in more detail hereinafter. It will be appreciated that electro-mechanical switches may be used to select one of the functions 33, 34, 35.

Figure 7:
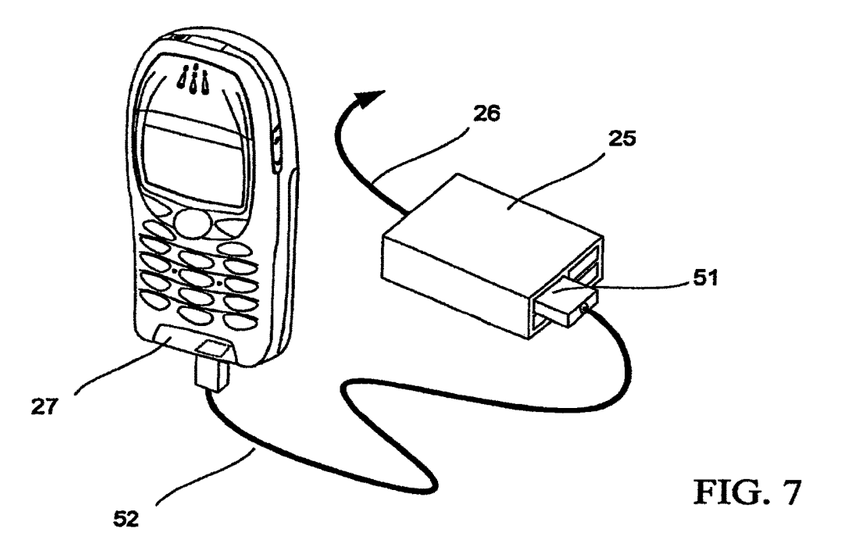
FIG. 7 shows the mobile telephone handset shown in FIG. 4 being connected to a USB hub.
Figure 8:
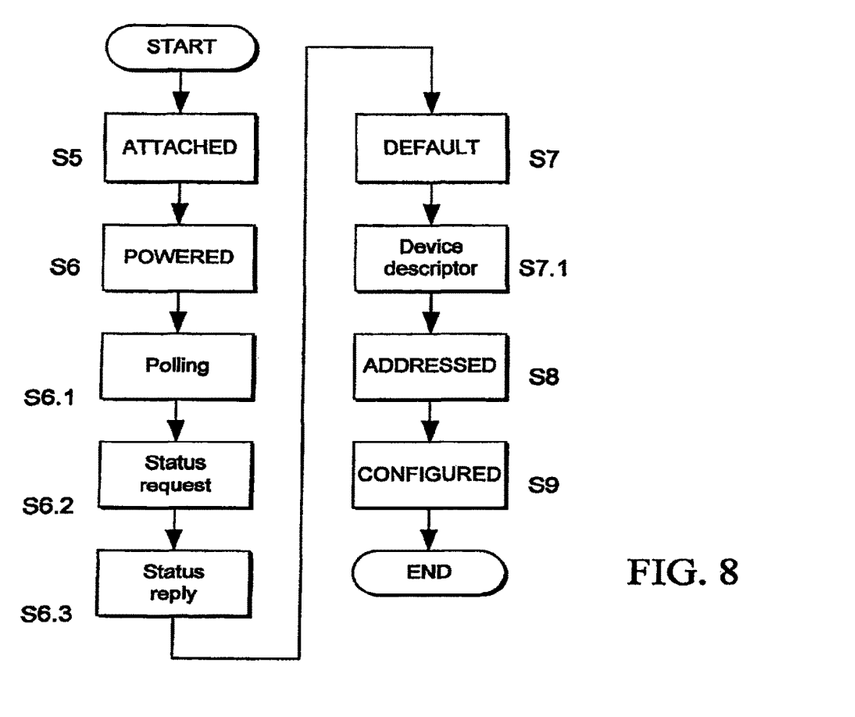
FIG. 8 is a process flow diagram by which the mobile telephone handset shown in FIG. 7 is attached and configured to the PC shown in FIG. 2.

Referring to FIGS. 7 and 8, the user attaches the handset 27 to one of four hub ports 51 using a USB cable 52 and bus enumeration takes place. The USB hub 25 senses that the handset 27 has been connected to one of the four ports 51 and changes the state of the port from disconnected to connected (step S5). The handset 27 provides its own power and so is deemed to be in a powered state (step S6). The PC 17 periodically polls the USB hub 25, which indicates that there is a change in status of one of the four hub ports 51 (step S6.1). The PC 17 issues commands to hub 25 to indicate the nature of change (step S6.2) and the hub replies with the identity of the port (step S6.3). The PC 17 issues a port enable signal and sends a reset command (step S7). At this point, the port 51 to which the handset 27 is connected is enabled and the handset 27 is in a default state and is addressable only through a default pipe at a default address. The PC 17 and the handset 27 exchange descriptor information (step S7.1) which will be described in greater detail below. At this point the PC 17 is informed which function 33, 34, 35 the handset 27 implements and selects an appropriate device driver. The PC 17 assigns a unique address to the handset 27 (step S8). At this stage the handset 27 is in an addressed state. The PC 17 reads configuration information from the handset (step S9). The handset 27 is now configured and the PC 17 can receive data from it.

The exchange of descriptor information at step S7.1 above will now be described.

Figure 9:
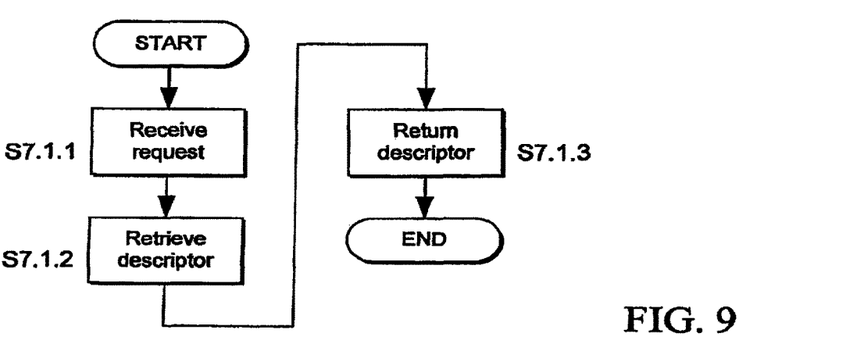
FIG. 9 is a process flow diagram of the mobile telephone handset and PC of FIG. 8 exchanging device information.
Figure 10:
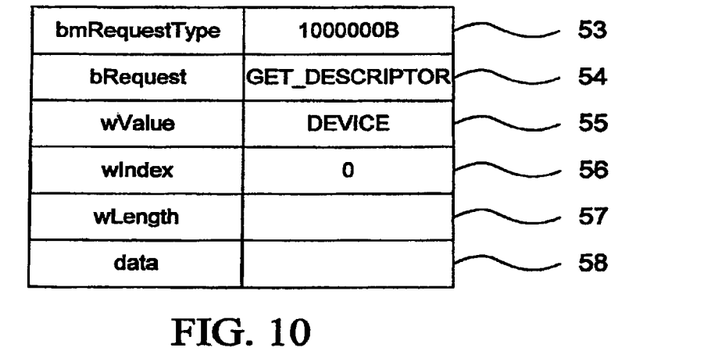
FIG. 10 is a schematic diagram of a request for a device descriptor.

Referring to FIGS. 9 and 10, the PC 17 sends a request GET_DESCRIPTOR over the default pipe to the handset 27 (step S7.1.1). The request GET_DESCRIPTOR comprises a request type field 53, a request field 54, a descriptor type 55 which in this example is set to "device", a descriptor index field 56 which is set to zero, a length field 57 which specifies the number of bytes which the handset should return and a data field 58.

Figure 11:
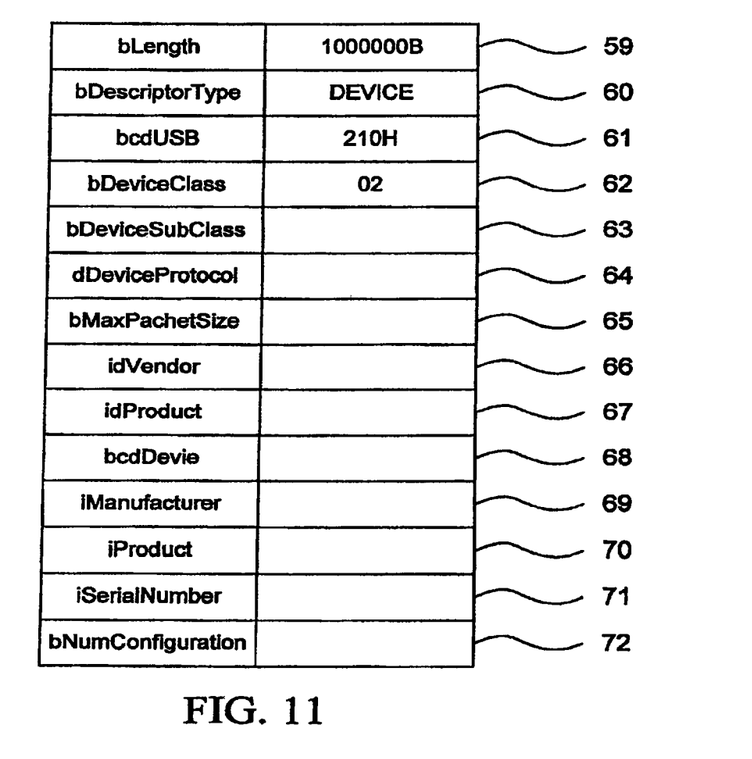
FIG. 11 is a schematic diagram of a device descriptor.

Referring to FIGS. 9 and 11, the handset 27 looks up the device descriptor DEVICE from memory 49 (Step S7.1.2) and returns it to the PC 17 (step S7.1.3). The device descriptor comprises a length field 59, a descriptor type field 60, a USB specification release number field 61, a device class code field 62, a device sub-class code field 63, a protocol code field 64, a maximum packet size field 65, a vendor ID field 66, a product ID field 67, a device release number field 68, an index of string descriptor 69 describing the manufacturer, an index of string descriptor describing the product 70, an index of string descriptor describing the device's serial number 71 and a field indicating the number of possible configurations 72. In this example, the device class code field 62 is set to 02 indicating a modem.

Once the USB system (see FIG. 1) of the PC 17 receives the device descriptor DEVICE through the default pipe, it passes information relating to the device class 62 to the PC's operating system. The PC's operating system selects and assigns a modem driver in a manner well known per se. Alternatively, the operating system may prompt the user to install a modem driver. Once the modem driver is installed and appropriate browser software is operating, the PC 17 is able to control the modem 34 and receive data.

If the user disconnects the handset 27 and wishes to use a different function, such as the microphone function 33, they re-enter the functions menu on the handset 27 and select the microphone function (steps S1-S5). When handset 27 is re-attached to the PC 17, a different device descriptor DEVICE is returned to the PC 17 during bus enumeration and so a different driver, this time a microphone driver, is assigned.

This has the advantage that all the functions of the handset 27 are available to PC 17 and are easily configured by the user.

It will be appreciated that many modifications may be made to the embodiments hereinbefore described. Instead of a PC, the host may be another mobile telephone handset, a games console or a network computer. The device need not be a mobile telephone handset, but a data communicator or another PC.

The invention claimed is:

1. A method of configuring first and second electronic devices, the first device being a master and the second device a slave, said second device comprising mobile telephone functionality and being configured to be able to perform a plurality of different selectable predefined functions, each selectable predefined function being associated with an appropriate device driver which relates to a particular USB device class and a particular USB device descriptor, the method comprising:
    attaching the first and second devices to one another using the bottom layer of the USB communication system;
    receiving, at said second device, preference information from a user relating to one of said plurality of functions of said second device to enable selection of one of the plurality of predefined functions, wherein the preference information is provided by the user using a menu of the second device, the menu providing the plurality of predefined functions for selection, and
    providing USB device descriptor information from the second device, relating to said one selected function, using the middle layer of the USB communication system, for assigning an appropriate device driver to allow said first device, with an appropriately assigned device driver, to use said one selected function using the third layer of the USB communication system,
    the method thereby allowing for repeatable connection of the second device to the first device to allow for use of respective different functionality of the second device according to user provided preference information.

2. A method according to claim 1, further comprising said first device requesting said information relating to a function from said second device.

3. A method according to claim 1, wherein said USB device descriptor information includes one or more of the following: device class code, device sub-class code, protocol code, vendor ID and product ID.

4. The method of claim 1, wherein each selectable predefined function is associated with an appropriate device driver and is changeable to allow the first device to respectively use at least some of the other plurality of the predefined functions of the second device upon re-attachment of the first and second devices.

5. The method of claim 1, wherein the second device is a mobile telephone handset.

6. The method of claim 1, wherein the first device is a personal computer.

7. A computer program, stored on a non-transitory computer readable medium, the computer program comprising computer code for an electronic slave device, wherein the slave device comprises mobile telephone functionality and is configured to be able to perform a plurality of different selectable predefined functions, each selectable predefined function being associated with an appropriate device driver which relates to a particular USB device class and a particular USB device descriptor, and the slave device is configured for communication with a master device, the computer code configured to, following attachment of the master and slave devices to one another using the bottom layer of the USB communication system:
  receive, at said slave device, information relating to one of said plurality of selectable predefined functions from a user, wherein the information is provided by the user using a menu of the slave device, the menu providing the plurality of selectable predefined functions for selection; and
  provide USB device descriptor information relating to said one selected function, using the middle layer of the USB communication system, for assigning an appropriate device driver, to allow the master device to use the selected function, with an appropriately assigned device driver, using the third layer of the USB communication system,
  the computer program thereby allowing for repeatable connection of the slave device to the master device to allow for use of respective different functionality of the slave device according to user provided preference information.

8. An electronic slave device configured to be able to perform a plurality of different selectable predefined functions, each selectable predefined function being associated with an appropriate device driver which relates to a particular USB device class and a particular USB device descriptor, the electronic slave device comprising:
  mobile telephone functionality,
  a controller for receiving preference information from a user for selecting one of said plurality of selectable predefined functions, wherein the preference information is provided by the user using a menu of the electronic slave device, the menu providing the plurality of predefined functions for selection, and
  a USB interface for providing, using the middle layer of the USB communication system following attachment of the electronic slave device to a master device using the bottom layer of the USB communication system, USB device descriptor information relating to the one selected function for assigning an appropriate device driver for the said one selected function to allow the master device to use said function, using the third layer of the USB communication system, with an appropriately assigned device driver,
  the electronic slave device thereby configured to allow for repeatable connection of the electronic slave device to the master device to allow for use of respective different functionality of the electronic slave device according to user provided preference information.

9. An electronic slave device according to claim 8, wherein the electronic slave device further comprises memory for storing USB device descriptor information for the plurality of different selectable predefined functions.

10. A system comprising first and second electronic devices, the first device being a master device and the second device being a slave device, said second device comprising mobile telephone functionality, said second device being configured to be able to perform a plurality of different selectable predefined functions, each selectable predefined function being associated with an appropriate device driver which relates to a particular USB device class and a particular USB device descriptor, said system configured to, following attachment of the first and second devices to one another using the bottom layer of the USB communication system:
  receive preference information from a user of the second device, the preference information relating to one of said plurality of functions of said second device to enable selection of one of the plurality of predefined functions, wherein the preference information is provided using a menu of the second device, the menu providing the plurality of predefined functions for selection,
  provide from the second device to said first device, using the middle layer of the USB communication system, USB device descriptor information relating to said one selected function, and
  provide for interfacing with said one selected function, using the middle layer of the USB communication system, so as to allow said first device to use said one selected function, using the third layer of the USB communication system, by using an assigned appropriate device driver,
  the system thereby allowing for repeatable connection of the second device to the first device to allow for use of respective different functionality of the second device according to user provided preference information.

* * * * *